United States Patent
Hsu et al.

(10) Patent No.: US 7,626,999 B2
(45) Date of Patent: Dec. 1, 2009

(54) APPARATUS AND METHODS FOR CIRCUIT EMULATION OF A POINT-TO-POINT PROTOCOL OPERATING OVER A MULTI-PACKET LABEL SWITCHING NETWORK

(75) Inventors: Kenneth Hsu, San Jose, CA (US); Mitri Halabi, San Jose, CA (US)

(73) Assignee: Tellabs San Jose, Inc., San Jose, CA (US)

( * ) Notice: Subject to any disclaimer, the term of this patent is extended or adjusted under 35 U.S.C. 154(b) by 1254 days.

(21) Appl. No.: 09/811,239

(22) Filed: Mar. 16, 2001

(65) Prior Publication Data

US 2002/0131408 A1   Sep. 19, 2002

(51) Int. Cl.
 *H04J 3/16*  (2006.01)
 *H04J 3/02*  (2006.01)
(52) U.S. Cl. ............... 370/466; 370/395.51; 370/401; 370/412; 370/539
(58) Field of Classification Search ............... 703/23; 370/395.5, 395.1, 395.52, 395.04; 709/236
See application file for complete search history.

(56) References Cited

U.S. PATENT DOCUMENTS

| | | | | |
|---|---|---|---|---|
| 5,936,965 A | * | 8/1999 | Doshi et al. | 370/469 |
| 5,959,753 A | * | 9/1999 | Duling et al. | 398/155 |
| 6,229,821 B1 | * | 5/2001 | Bharucha et al. | 370/471 |
| 6,259,699 B1 | * | 7/2001 | Opalka et al. | 370/398 |
| 6,408,001 B1 | * | 6/2002 | Chuah et al. | 370/392 |
| 6,604,136 B1 | * | 8/2003 | Chang et al. | 709/223 |
| 6,614,760 B1 | * | 9/2003 | Suzuki et al. | 370/244 |
| 6,721,316 B1 | * | 4/2004 | Epps et al. | 370/389 |
| 6,731,649 B1 | * | 5/2004 | Silverman | 370/466 |
| 6,751,238 B1 | * | 6/2004 | Lipp et al. | 370/541 |
| 6,826,196 B1 | * | 11/2004 | Lawrence | 370/466 |
| 6,831,932 B1 | * | 12/2004 | Boyle et al. | 370/539 |
| 6,898,213 B1 | * | 5/2005 | Shimelmitz et al. | 370/537 |
| 7,170,856 B1 | * | 1/2007 | Ho et al. | 370/230 |

OTHER PUBLICATIONS

Malis-A et al., "SONET/SDH Circuit Emulation Services Over MPLS (CEM)" Vivace Networks Inc via Goggle. Feb. 200. p. 1-14.*
Yun-K.Y. "A Terabit Multiservice Switch" IEEE Micro, Feb. 2001, p. 58-69.*
Doverspike et al., Future Transport Network Architecture, IEEE Communications Magazine, Aug. 1999, 96-101.*
Um et al., "A Study on Internetworking Scenarios Between ATM-based MPLS Network and IPOA/Lane Network", Information and Communications University, Korea, pp. 275-280, Figures 1-7.*

(Continued)

*Primary Examiner*—Steven H Nguyen
(74) *Attorney, Agent, or Firm*—Hamilton, Brook, Smith & Reynolds, P.C.

(57) ABSTRACT

An exemplary method for circuit emulation over a multi-packet label switching (MPLS) network comprises the steps of receiving a time division multiplexed data stream at an ingress end, dividing the data stream into a set of fixed sized packets, adding a service header to each of the packets, adding an additional header on top of the service header in accordance with MPLS protocols, removing the additional header after each packet has been processed by the MPLS network, and using the service header to recover the data stream at an egress end.

12 Claims, 4 Drawing Sheets

OTHER PUBLICATIONS

Armitage-G, MPLS: The Magic Behind the Myths, IEEE Communications Magazine, Jan. 2000, p. 124-131, Figures 1-10.*
"Vivance Networks Closes $25 Million in New Financing" Vivace Networks Inc. Press Release Dec. 1999.*
Loukola-M "Introducing Quality of Service to IP Packet Forwarding" Helsinki University of Technology. Jul. 1999 p. 1-64.*
Armitage et al., "MPLS: The Magic Behind the Myths" IEEE Communications Magazine. Jan. 2000 p. 124-130.*
Yun-K., "A Terabit Multiservice Switch" IEEE 2001 p. 58-70.*
Um et al., "A Study on Interworking Scenario Between ATM-Based MPLS Newtork and IPOA/LANE Network" p. 275-280.*
Altera Corporation, "Implementing Voice Over Internet Protocol", Sep. 2000, Altera Corporation, Version 1.1, pp. 1-14.*
K. Hsu, SONET/sdh circuit emulation service over MPLS (CEM), Jul. 2000, Network WOrking Group, pp. 1-7.*
Yun, K. Y., "A Terabit Multiservice Switch", *IEEE Micro*, Feb. 2001, pp. 58-69.
Doverspike et al., Future Transport Network Architectures, *IEEE Communications Magazine*, Aug. 1999, pp. 96-101.
Um et al., "A Study on Interworking Scenarios between ATM-Based MPLS Network and IPOA/LANE Network", *Information and Communications University, Korea*, pp. 275-280, Figures 1-7.
Armitage, G. MPLS: The Magic Behind the Myths, *IEEE Communications Magazine*, Jan. 2000, pp. 124-131, Figures 1-10.
"Circuit Emulation Service Interoperability Specification", ARM Forum af-vtoa-0078.000, V2.0, Jan. 1997.

* cited by examiner

| TRANSPORT OVERHEAD N*3 COLUMNS | TRACE (J1) | FIXED STUFF N/3-1 COLUMNS FOR STS-Nc | PAYLOAD CAPACITY 86 COLUMNS FOR STS-1 N*87-N/3 COLUMNS FOR STS-Nc |
|---|---|---|---|
| | BIP-8 (B3) | | |
| | SIGNAL LABEL (C2) | | |
| | PATH STATUS (G1) | | |
| | USER CHANNEL (F2) | | |
| | INDICATOR (H4) | | |
| | GROWTH (Z3) | | |
| | GROWTH (Z4) | | |
| | TANDEM (N1) | | |

APPARATUS AND METHODS FOR CIRCUIT EMULATION OF A POINT-TO-POINT PROTOCOL OPERATING OVER A MULTI-PACKET LABEL SWITCHING NETWORK

FIELD OF THE INVENTION

This invention relates to apparatus and methods for providing circuit emulation of a point-to-point protocol. In particular, this invention relates to apparatus and methods for providing circuit emulation of a point-to-point protocol operating over a multi-protocol label switching (MPLS) network.

BACKGROUND OF THE INVENTION

Time division multiplexed (TDM) data streams (including voice, data, and private lease line services) have very strict timing and frequency requirements. As a result, traditionally, TDM data streams have been transported in TDM circuits to ensure a continuous transport of bit streams to meet such timing and frequency requirements. For example, a T1 line leased to transport TDM digital signals may be divided into 24 channels. Each channel connects two physical locations (e.g., point A and point B).

Recently, many existing systems have attempted to use networks, such as asynchronous transfer mode (ATM) networks, to emulate TDM circuits to perform more efficient transfers of TDM data streams. These networks have to emulate TDM circuits in order to meet the strict TDM timing and frequency requirements.

To date, however, there is no effective method to transport TDM data streams over a packet network, such as the MPLS network. Using packet networks is desirable because packet networks are currently the fastest growing of all transport means. One problem to overcome before achieving an efficient use of packet technology is to cope with or reduce the possibility of violating the strict TDM technology timing and frequency requirements. Another problem to overcome is to cope with or reduce the probability of dropped or scrambled packets in a data stream.

Thus, it is desirable to provide apparatus and methods that provide circuit emulation of a point-to-point protocol operating over a MPLS network to process TDM data streams.

SUMMARY OF THE INVENTION

An exemplary method for circuit emulation over a multi-packet label switching (MPLS) network comprises the steps of receiving a time division multiplexed data stream at an ingress end, dividing the data stream into a set of fixed sized packets, adding a service header to each of the packets, adding an additional header on top of the service header in accordance with MPLS protocols, removing the additional header after each packet has been processed by the MPLS network, and using the service header to recover the data stream at an egress end.

In one embodiment, the exemplary method further comprises the steps of monitoring the data stream and attaching an alarm bit in a service header of a subsequent packet if a break in the data stream is detected.

In another embodiment, the exemplary method further comprises the steps of using a structure pointer in the service header to indicate whether a header byte in a synchronous payload envelope is present within a packet, the structure pointer indicating the location of the header byte in the packet. In an exemplary embodiment, the structure pointer reserves a pointer value indicating that the header byte is not present within the packet.

In yet another embodiment, when the ingress and egress clocks can be traced to a common reference source, the exemplary method further comprises the steps of recording a stuffing time difference in a service header at the ingress end and implementing the stuffing time difference at the egress end.

In yet another embodiment, when the ingress and egress clocks cannot be traced to a common reference source, the exemplary method further comprises the steps of: (a) storing a first set of frames into a data buffer, (b) calculating a first data average of the first set of frames in the data buffer to obtain a threshold value, (c) storing a next set of frames into the data buffer, (d) calculating a next data average of the next set of frames in the data buffer, (e) comparing the next data average to the threshold value, (f) if the next data average is greater than the threshold value (1) generating a negative justification indicator and (2) sending one more byte at the egress end, (g) if the next data average is less than the threshold value (1) generating a positive justification indicator and (2) sending one less byte at the egress end, and (h) repeating the steps (c)-(g).

In yet another embodiment, the exemplary method further comprises the steps of checking a sequence counter in the service header of each packet in the set of packets, locating at least one header byte in the set of packets, measuring all bytes between two header bytes, and pushing the set of packets into a frame.

In another embodiment, the exemplary method further comprises the steps of checking a sequence counter in the service header of each packet in the set of packets to determine if all packets are present sequentially and inserting a dummy packet if a packet is missing in the set of packets. In an exemplary embodiment, when an out of sequence packet is received later, it is discarded.

In yet another embodiment, the exemplary method further comprises the steps of checking a sequence counter in the service header of each packet in the set of packets to determine if all packets are present sequentially, terminating a current connection if multiple packets are missing in the set of packets, discarding the set of packets, and establishing a new connection to begin receiving packets.

In yet another embodiment, the exemplary method further comprises the steps of checking a sequence counter in the service header of each packet in the set of packets to determine if all packets are present sequentially and establishing an in-frame condition after the set of packets are received in sequence. In an exemplary embodiment, the method further comprises the steps of determining whether the in-frame condition is valid (e.g., receiving packets that are out of sequence) and terminating a current connection if the in-frame condition is not valid.

An exemplary computer program product for circuit emulation over a multi-packet label switching (MPLS) network comprises logic code for receiving a time division multiplexed data stream at an ingress end, logic code for dividing the data stream into a set of fixed sized packets, logic code for adding a service header to each of the packets, logic code for adding an additional header on top of the service header in accordance with MPLS protocols, logic code for removing the additional header after each packet has been processed by the MPLS network, and logic code for using the service header to recover the data stream at an egress end.

In one embodiment, the exemplary computer program product further comprises logic code for monitoring the data stream and logic code for attaching an alarm bit in a service header of a subsequent packet if a break in the data stream is detected.

In another embodiment, the exemplary computer program product further comprises logic code for using a structure pointer in the service header to indicate whether a header byte in a synchronous payload envelope is present within a packet, the structure pointer indicating the location of the header byte in the packet. In an exemplary embodiment, the computer program product includes logic code for reserving a pointer value indicating that the header byte is not present within the packet.

In yet another embodiment, when the ingress and egress clocks can be traced to a common reference source, the exemplary computer program product further comprises logic code for recording a stuffing time difference in a service header at the ingress end and logic code for implementing the stuffing time difference at the egress end.

In yet another embodiment, when the ingress and egress clocks cannot be traced to a common reference source, the exemplary computer program product further comprises: (a) logic code for storing a first set of frames into a data buffer, (b) logic code for calculating a first data average of the first set of frames in the data buffer to obtain a threshold value, (c) logic code for storing a next set of frames into the data buffer, (d) logic code for calculating a next data average of the next set of frames in the data buffer, (e) logic code for comparing the next data average to the threshold value, (f) if the next data average is greater than the threshold value (1) logic code for generating a negative justification indicator and (2) logic code for sending one more byte at the egress end, (g) if the next data average is less than the threshold value (1) logic code for generating a positive justification indicator and (2) logic code for sending one less byte at the egress end, and (h) logic code for repeating (c)-(g).

In another embodiment, the exemplary computer program product further comprises logic code for checking a sequence counter in the service header of each packet in the set of packets, logic code for locating at least one header byte in the set of packets, logic code for measuring all bytes between two header bytes, and logic code for pushing the set of packets into a frame. In an exemplary embodiment, the computer program product also includes logic code for checking a sequence counter in the service header of each packet in the set of packets to determine if all packets are present sequentially and logic code for inserting a dummy packet if a packet is missing in the set of packets. In another exemplary embodiment, the computer program product also includes logic code for receiving an out of sequence packet and logic code for discarding the out of sequence packet.

In yet another embodiment, the exemplary computer program product further comprises logic code for checking a sequence counter in the service header of each packet in the set of packets to determine if all packets are present sequentially, logic code for terminating a current connection if multiple packets are missing in the set of packets, logic code for discarding the set of packets, and logic code for establishing a new connection to begin receiving packets.

In yet another embodiment, the exemplary computer program product further comprises logic code for checking a sequence counter in the service header of each packet in the set of packets to determine if all packets are present sequentially and logic code for establishing an in-frame condition after the set of packets are received in sequence. In an exemplary embodiment, the computer program product further comprises logic code for determining whether the in-frame condition is valid and logic code for terminating a current connection if the in-frame condition is not valid.

DETAILED DESCRIPTION OF THE INVENTION

The basic synchronous optical network (SONET) modular signal is the synchronous transport signal level-1 (STS-1). A number of STS-1s may be multiplexed into higher level signals denoted as STS-N with N synchronous payload envelopes (SPEs). In an exemplary embodiment, each SONET frame is 125 µs and comprises nine rows. An STS-N frame has nine rows and N*90 columns. Of the N*90 columns, the first N*3 columns are transport overhead and the other N*87 columns are SPEs. Typically, the first 9-byte column of each SPE is the path overhead (POH) and the remaining columns form the payload capacity with fixed stuff (STS-Nc).

Figure 1:
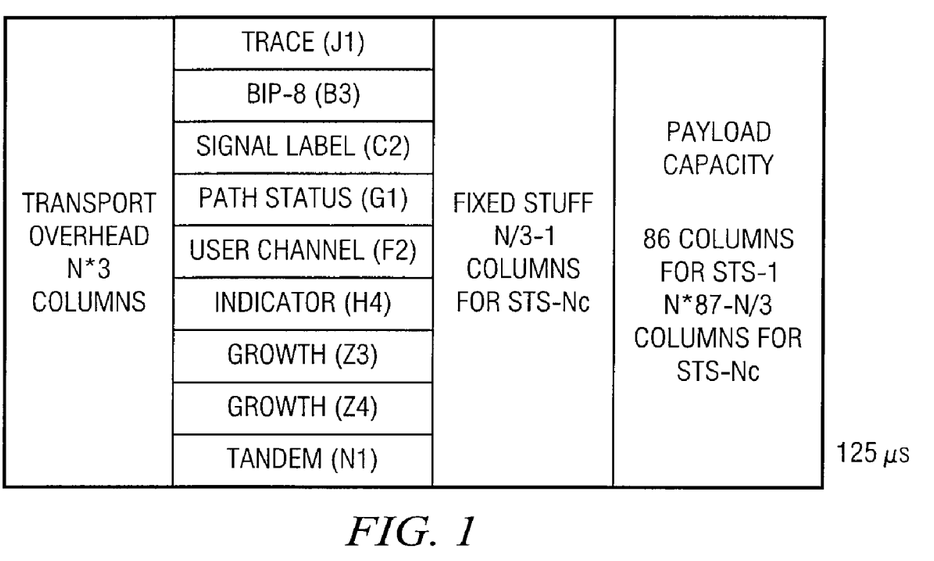
FIG. 1 schematically illustrates an exemplary prior art STS frame.

FIG. 1 illustrates an exemplary STS-1 or STS-Nc frame. In FIG. 1, the POH of an STS-1 or STS-Nc is nine bytes in nine rows. The payload capacity of an STS-1 (without fixed stuff) is 774 bytes per frame. The payload capacity of an STS-3c, which has zero fixed stuff byte, can be calculated as follows (3*87−1)*9 or is 2,340 bytes per frame. The payload capacity of a concatenated STS-Nc, where N>3, can be calculated as follows: (N*87−N/3−(N/3−1))*9 bytes, where the (N/3−1) represents the fixed stuff. Generally, there are 8,000 SONET frames per second; thus, the SPE rate (i.e., POH plus payload capacity) of a STS-1 is 783*8*8,000=50.112 Mb/s.

Figure 2:
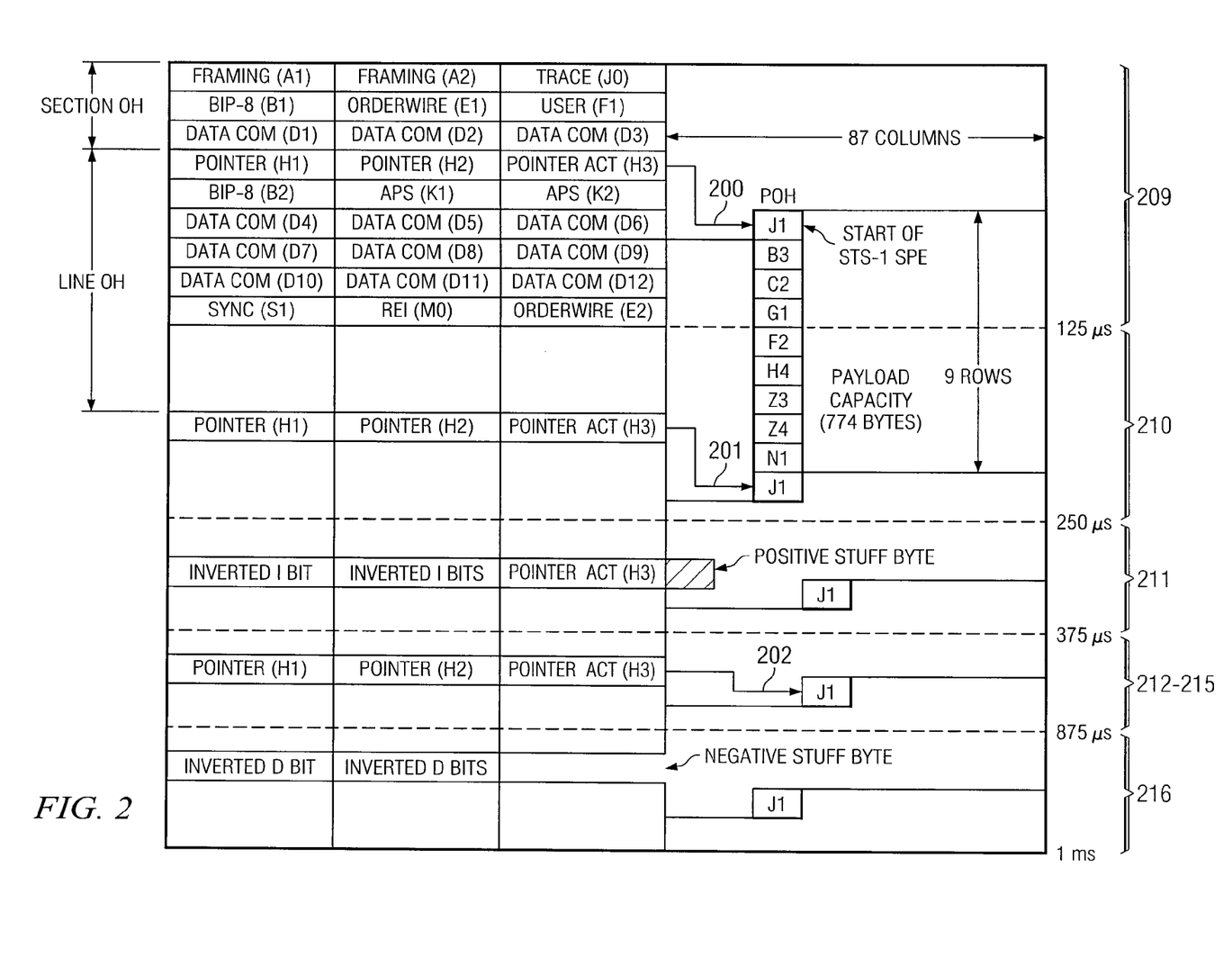
FIG. 2 schematically illustrates an exemplary prior art overheads and pointer operations.

FIG. 2 illustrates a schematic representation of a prior art SONET frame overhead and payload pointer operations. In FIG. 2, eight complete frames 209-216 are presented for illustration purposes. At the first frame 209, the payload pointer 200, contained in H1 and H2 of the line overhead, designates the location of the J1 byte where the SPE begins. The STS-1 payload pointer allows each SPE to float within the STS frame. Any difference in phase and frequency between the transport overhead and the SPE can be accommodated through pointer operations. At frame 210, the payload pointer 201, contained in H1 and H2 of the line overhead, designates the end of the previous SPE and the location of the J1 byte where the next SPE begins. If the SPE rate is too slow after frame 210, a positive stuff byte appears immediately after the H3 byte in the next frame 211. At the end of frame 211, the payload pointer 202, contained in H1 and H2 of the line overhead, designates the location of the J1 bytes of the next frames. Typically, the pointer remains constant for at least three frames. After a positive stuff byte, the subsequent payload pointer (202) equals the previous pointer (201) plus one. In an exemplary embodiment, the pointer 202 remains constant for four transport frames 212, 213, 214, and 215. After frame 215, if the SPE rate is too fast, then a negative stuff byte appears in the H3 byte in the next frame 216. After a negative stuff byte, the subsequent payload pointer (not shown) equals the previous pointer (202) minus one. Typically, the pointer remains constant for at least three frames (not shown).

Figure 3:
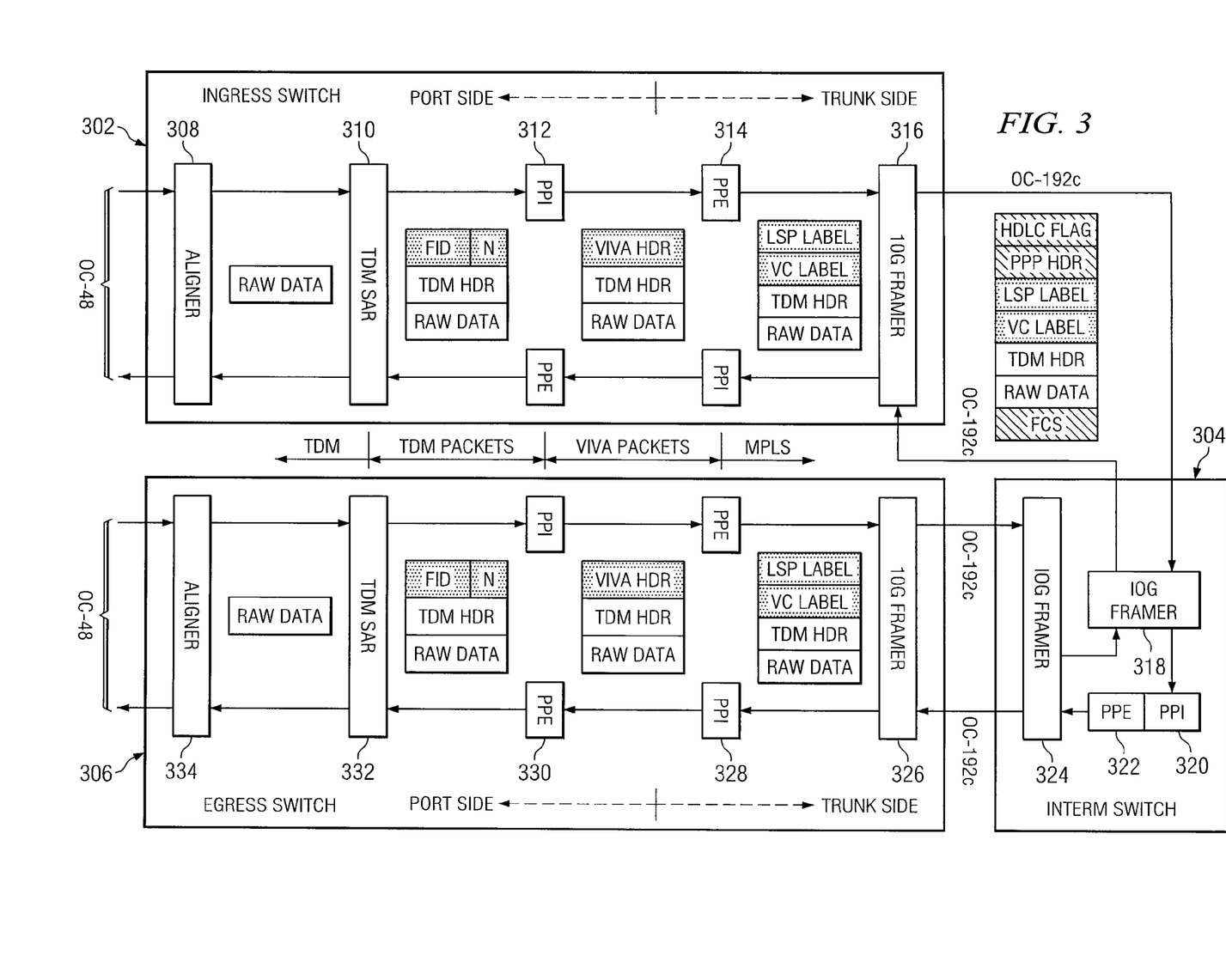
FIG. 3 schematically illustrates exemplary ingress, intermediate, and egress switches in accordance with an embodiment of the invention.

In an exemplary embodiment, during a TDM circuit emulation, the entire SPE of a STS level is encapsulated into packets and transported. FIG. 3 illustrates exemplary ingress 302, intermediate 304 and egress 306 switches for performing encapsulations in accordance with an embodiment of the invention. The ingress switch 302 includes a SONET payload aligner 308, a TDM segmentation and realignment (SAR) 310, an ingress packet parser (PPI) 312, an egress packet parser (PPE) 314, and a 10 Gb/s SONET transport framer (10 G framer) 316. At the ingress switch 302, TDM data streams are received from SONET lines (e.g., optical carrier OC-48) via the SONET payload aligner 308 and passed into the TDM SAR 310. The TDM SAR 310 de-maps and segments received data streams into TDM packets. In an exemplary embodiment, the TDM SAR 310 accepts STS SPEs as raw data and segments the SPEs into TDM packets. In one embodiment, a TDM packet comprises a 22 bit flow ID (FID), a 10-bit payload size (N), a 32-bit TDM header, and N bytes of payload data. Next, TDM packets are processed by the PPI 312. After processing, the PPI 312 overwrites the 32-bit FID/N word with a Viva header to convert the TDM packet to a Viva packet. The Viva packets are passed to the PPE 314. The PPE 314 replaces each packet's Viva header with two MPLS labels: virtual circuit and label switched path labels. Next, the 10 G framer 316 takes the resulting MPLS packets from the PPE 314 and encapsulates them in high-level data link control (HDLC) point-to-point protocol (PPP) to be transported in a SONET line (e.g., OC-192c).

The intermediate switch 304 includes a first 10 G framer 318, a PPI 320, a PPE 322, and a second 10 G framer 324. The first 10 G framer 318 in the intermediate switch 304 delineates packet boundaries using flag sequence detection, performs byte de-stuffing, and validates the frame check sequence (FCS) for each packet. The validated packet is sent through the PPI 320 and the PPE 322 for label swapping. The label swapped packet is re-encapsulated in the point-to-point protocol by the second 10G framer 324 and sent over another SONET line (e.g., OC-192c). In an exemplary embodiment, multiple intermediate switches 304 may be present between the ingress switch 302 and the egress switch 306. In such a case, the process performed by the intermediate switch 304 as described above is repeated in each intermediate switch.

The egress switch 306 includes a 10G framer 326, a PPI 328, PPE 330, a TDM SAR 332, and a SONET payload aligner 334. At the egress switch 306, the encapsulating process is reversed. HDLC envelopes are removed and MPLS labels are processed. The TDM packet, along with a 32-bit FID/N word, is sent to its TDM SAR 332 for reassembly. Raw data in the TDM packet is extracted by the TDM SAR 332 and inserted onto a SONET line (e.g., an OC-48 line) by the SONET payload aligner 334.

Figure 4:
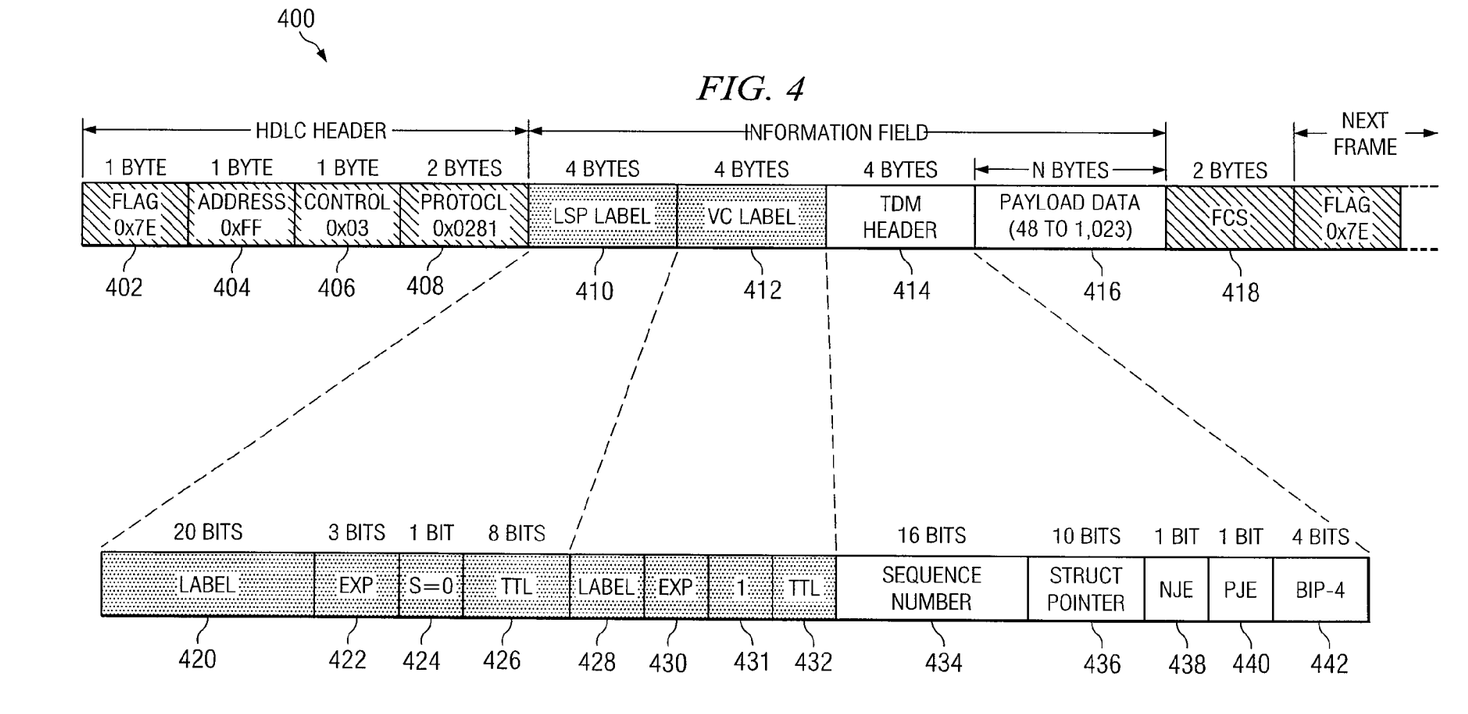
FIG. 4 schematically illustrates an exemplary packet in accordance with an embodiment of the invention.

FIG. 4 illustrates an exemplary packet 400 in accordance with an embodiment of the invention. Generally, the packet 400 includes a HDLC header section, an information field, and 2 bytes of FCS field. The HDLC header section includes a 1 byte flag 402, a 1 byte address 404, a 1 byte control 406, a 2 bytes protocol 408. Each packet 400 begins and ends with an 8-bit flag 402 but only one flag 402 is required between packets 400. The address byte 404, the control 406, and protocol 408 are PPP header bytes in HDLC-link framing. The address byte 404 contains the all-stations address to be recognized and received. The control byte 406 identifies the packet frame 400 as unnumbered information command with poll/final bit cleared. The protocol field 408 identifies the datagram encapsulated in the information field to be MPLS unicast.

The information field includes a 4 bytes LSP label 410, a 4 bytes VC label 412, a 4 bytes TDM header 414, and N bytes payload data 416. The LSP label 410 and the VC label 412 are MPLS labels. The LSP label 410 is a trunk label that identifies the trunk in use. The VC label 412 is a service label that identifies a service implemented on a trunk. Each MPLS label (i.e., the LSP label 410 and the VC label 412) includes a 20-bit label value 420 and 428, 3-bit experimental use value (EXP) 422 and 430, a bottom of stack bit (S) 424 and 430, and an 8-bit time to live (TTL) 426 and 432. In one embodiment, the EXP bits carry drop precedence in accordance with MPLS standards. The stack bit is set to mark the packet as the last entry in the MPLS protocol stack.

The TDM header 414 is 32 bits long and comprises a 16-bit sequence number counter 434 that cycles from 0 to 65,535, a 10-bit structure pointer 436 for pointing to the header byte (i.e., the J1 byte—see FIG. 2) in the payload area, a negative justification bit (NJE) 438, a positive justification bit (PJE) 440, and a 4-bit bit interleaved parity (BIP) 442. Packets transferred in sequence are sequentially numbered at the ingress TDM SAR 310 in the sequence number counter 434. The values in the sequence number counter 434 is used by the egress TDM SAR 332 to recover the original TDM data stream. The value of the structure pointer is from 0 to 1,022 with 0 being the first byte after the TDM header. The location of the J1 byte in the payload data 416 is indicated by the value of the structure pointer 436. If the payload data 416 does not include a J1 byte, the structure pointer 436 is set to 1,023.

The NJE 438 is set for a negative justification event. The PJE 440 is set for a positive justification event. A positive or negative event is carried in five consecutive packets at the ingress TDM SAR 310. The egress TDM SAR 332 plays out a positive or negative event when three out of five packets having their NJE 438 or PJE 440 set are received. If both the NJE 438 and the PJE 440 bits are set, then a path alarm event has occurred. A path alarm event occurs when a break in the TDM data stream occurs. When the TDM data stream breaks, an alarm bit is set (e.g., by setting both the PJE and the NJE in a packet) in a subsequent packet in a stream of packets so that at the egress end, any packet reassembly is terminated and packets for the TDM data stream is re-transmitted.

The BIP 442 is over the first 28 header bits. The frame check sequence field (FCS) 418 is optional. When used, it represents a calculation of all bits between the opening flag and the FCS 418, but does not include bits inserted for synchronization or transparency.

General Operation

The timing of packet transfers is periodically readjusted using one of two modes: a synchronous timing mode or an adaptive clock recovery mode. The synchronous timing mode is used when the clocks at both the ingress and egress ends of the process can be traced to a common reference source. The NJE and PJE bits work to record stuffing time differences at the ingress end and play out the stuffing time differences at the egress end. In this way, the characteristics of the original clock is preserved.

The adaptive clock recovery mode is used when the clocks at both the ingress and egress ends of the process cannot be traced to a common reference source. When operating under the adaptive clock recovery mode, data is stored in a buffer over a set of SONET frames. For example, over 64 SONET frames, data stored in the buffer is measured and an average is calculated. Next, using the average as a threshold value, over the next 64 SONET frames, if the average data buffer gets bigger, then a NJE stuffing indication is generated to send one more byte at the egress end. On the other hand, over the next 64 SONET frames, if the average data buffer gets smaller, then a PJE stuffing indication is generated to send one less byte at the egress end. This comparison to the threshold values repeats to continuously monitor and correct clock drifts between the ingress and egress ends.

After receiving all the packets for a SONET frame, the sequence number in the sequence counter 434 in each packet is checked to make sure that the received packets are in sequential order. Next, header bytes (or J1 bytes) are located by reviewing the structure pointer 436 in each packet and all bytes between two header bytes are measured. If the bytes between two header bytes are acceptable, then all the packets are pushed into a frame or reassembled.

Once in a while, one or more packets for a SONET frame may be dropped. This is verified by examining the sequence number in the sequence counter 434 in each received packet. When only one packet is dropped, a dummy packet of appropriate bytes is substituted and played. This way, any loss of actual data is balanced with having to disconnect and begin packet transfers for the SONET frame all over again. If eventually the dropped packet shows up, that packet is ignored. In a TDM data stream, playing the right amount of bits is of paramount importance over, for example, playing the correct bits. If the requisite number of bits is not played, timing of the data stream may be shifted which will create an overflow and require a restart of the entire process. Thousands of packets could be lost if one out of sequence packet was not substituted by something else and played in the required time.

If multiple packets for a SONET frame are dropped or out of sequence, the connection is terminated and whatever packets that were already received are discarded. In an exemplary embodiment, a dummy byte could be continuously played out while the connection is terminated.

Generally, the size of an HDLC frame is the TDM block size plus total packet overhead. The HDLC frame size is used to calculate the bandwidth requirement of transporting a TDM circuit in a trunk line.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for circuit emulation over a multi-packet label switching (MPLS) network, comprising:
   receiving a time division multiplexed data stream at an ingress end from an optical carrier;
   dividing the data stream into a set of fixed sized packets;
   adding a service header to each of the packets;
   adding an additional header on top of the service header in accordance with MPLS protocols;
   removing the additional header after each packet has been processed by the MPLS network;
   using the service header to recover the data stream at an egress end;
   storing a first set of frames of the data stream into a data buffer during times clocks of the ingress and egress ends cannot be traced to a common reference source;
   calculating a first data average of the first set of frames in the data buffer to obtain a threshold value;
   storing a next set of frames into the data buffer;
   calculating a next data average of the next set of frames in the data buffer;
   comparing the next data average to the threshold value; and
   if the next data average is greater than the threshold value, generating a negative justification indicator and sending one more byte at the egress end, or if the next data average is less than the threshold value, generating a positive justification indicator and sending one less byte at the egress end.

2. The method of claim 1, further comprising:
   monitoring the data stream; and
   attaching an alarm bit in a service header of a subsequent packet if a break in the data stream is detected.

3. The method of claim 1, further comprising:
   using a negative justification bit and a positive justification bit in the service header to indicate whether the synchronous payload envelope includes a negative stuff byte or a positive stuff byte.

4. The method of claim 1, wherein the service header includes a structure pointer to indicate whether a header byte indicating a start of a synchronous payload envelope is present within a packet, the structure pointer indicating a location of the header byte in the packet.

5. The method of claim 1, further comprising:
   recording a stuffing time difference in a service header at the ingress end; and
   implementing the stuffing time difference at egress end.

6. The method of claim 4 wherein the structure pointer reserves a pointer value indicating that the header byte is not present within the packet.

7. The method of claim 1, further comprising:
   checking a sequence counter in the service header of each packet in the set of packets;
   locating at least one header byte in the set of packets;
   measuring all bytes between two header bytes; and
   pushing the set of packets into a frame.

8. The method of claim 1, further comprising:
   checking a sequence counter in the service header of each packet in the set of packets to determine if all packets are present sequentially: and
   inserting a dummy packet if a packet is missing in the set of packets.

9. The method of claim 8, further comprising:
   receiving an out of sequence packet; and
   discarding the out of sequence packet.

10. The method of claim 1, further comprising:
    checking a sequence counter in the service header of each packet in the set of packets to determine if all packets are present sequentially;
    terminating a current connection if multiple packets are missing in the set of packets;
    discarding the set of packets; and
    establishing a new connection to begin receiving packets.

11. The method of claim 1, further comprising:
    checking a sequence counter in the service header of each packet in the set of packets to determine if all packets are present sequentially; and
    establishing an in-frame condition after the set of packets are received in sequence.

12. The method of claim 11, further comprising:
    determining whether the in-frame condition is valid; and
    terminating a current connection if the in-frame condition is not valid.

* * * * *

UNITED STATES PATENT AND TRADEMARK OFFICE
CERTIFICATE OF CORRECTION

PATENT NO. : 7,626,999 B2 Page 1 of 1
APPLICATION NO. : 09/811239
DATED : December 1, 2009
INVENTOR(S) : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1923 days.

Signed and Sealed this

Second Day of November, 2010

David J. Kappos
*Director of the United States Patent and Trademark Office*